(12) United States Patent
Wirth et al.

(10) Patent No.: US 8,939,488 B2
(45) Date of Patent: Jan. 27, 2015

(54) RAIL WHEEL

(75) Inventors: Xaver Wirth, Ismaning (DE); Christian Mosbach, Alling (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 169 days.

(21) Appl. No.: 12/811,131

(22) PCT Filed: Dec. 19, 2008

(86) PCT No.: PCT/EP2008/010931
§ 371 (c)(1),
(2), (4) Date: Jun. 29, 2010

(87) PCT Pub. No.: WO2009/086900
PCT Pub. Date: Jul. 16, 2009

(65) Prior Publication Data
US 2010/0283276 A1 Nov. 11, 2010

(30) Foreign Application Priority Data
Jan. 11, 2008 (DE) .......................... 10 2008 003 923

(51) Int. Cl.
*B60B 17/00* (2006.01)
*F16D 65/12* (2006.01)
*F16D 65/02* (2006.01)

(52) U.S. Cl.
CPC .............. F16D 65/124 (2013.01); F16D 65/12 (2013.01); *F16D 2065/1312* (2013.01); *F16D 2065/138* (2013.01); *F16D 2065/1392* (2013.01); *F16D 2200/0017* (2013.01)
USPC ................. 295/1; 188/33; 301/6.91

(58) Field of Classification Search
CPC ....... B60B 17/00; F16D 65/12; F16D 65/124; F16D 2065/138
USPC ............ 295/1, 7, 8, 21; 301/6.1, 6.91; 188/33
See application file for complete search history.

(56) References Cited

U.S. PATENT DOCUMENTS

| 4,721,430 | A | * | 1/1988 | Littke et al. .................... 414/537 |
| 5,010,985 | A | * | 4/1991 | Russell et al. ........... 188/218 XL |
| 5,538,114 | A | * | 7/1996 | White et al. .............. 188/218 R |
| 7,625,030 | B2 | * | 12/2009 | Bieker et al. ...................... 295/7 |

FOREIGN PATENT DOCUMENTS

| DE | 2 306 164 | 8/1974 |
| DE | 296 04 157 U1 | 7/1997 |

(Continued)

OTHER PUBLICATIONS

"The Stainless Steel Information Center" (http://web.archive.org/web/20061231092633/http://www.ssina.com/finshes/sheetsamples.html), Dec. 31, 2006.*
International Preliminary Report on Patentability and Written Opinion of the International Search Authority for International Patent Application No. PCT/EP2008/010931.
International Search Report mailed Apr. 27, 2009 for International Patent Application No. PCT/EP2008/010931.

(Continued)

*Primary Examiner* — Kip T Kotter
(74) *Attorney, Agent, or Firm* — Barnes & Thornburg LLP

(57) ABSTRACT

A rail wheel with a wheel body and wheel brake discs connected thereto with fastening elements on both sides is designed in such a way that at least in the respective contact regions of the wheel brake discs a mechanically and thermally highly resilient intermediate layer is arranged on the wheel body.

10 Claims, 5 Drawing Sheets

(56) References Cited

FOREIGN PATENT DOCUMENTS

| EP | 0 360 435 A | 3/1990 |
| EP | 0 429 211 A | 5/1991 |
| EP | 0 809 037 A | 11/1997 |
| FR | 2 698 425 A | 5/1994 |
| GB | 2 390 885 A | 1/2004 |
| JP | 9-100852 | 4/1997 |

OTHER PUBLICATIONS

Germany Office Action for German Patent Application No. 10 2008 003 923.3, dated Nov. 12, 2012.
German Office Action of Application No. 2010-541711 dated Oct. 18, 2013.
German Office Action of Application No. 2010-541711 dated Apr. 25, 2013.

* cited by examiner

RAIL WHEEL

CROSS-REFERENCE TO RELATED APPLICATIONS

The present application claims the benefit of priority to International Patent Application No. PCT/EP2008/010931 filed 19 Dec. 2008, which further claims the benefit of priority to German Patent Application No. 10 2008 003 923.3 filed 11 Jan. 2008, the contents of which are incorporated herein by reference in their entirety.

BACKGROUND

The invention relates to a rail wheel.

In the known rail wheels, the wheel brake disks connected to the wheel body on both sides are fastened to the wheel body by a plurality of fastening elements, primarily throughbolts, distributed over the circumference.

In this case, the wheel brake disks bear with integrally formed cooling ribs, centering and fastening eyes directly against the wheel body, to be precise against a circumferential wheel web which connects a wheel hub to an outer race.

However, considerable operationally induced problems arise due to the direct contact of the wheel brake disks with the wheel body.

For example, during a braking operation, as a result of the axial temperature gradients which occur, considerable excessive rises in the surface pressure occur radially on the outside of the wheel brake disk between the wheel web and the contact regions. (If the respective brake disk were not bolted to the wheel body, it would assume the shape of a Belleville spring).

In addition, the annular wheel brake disks have the tendency to deform in an opposed plate-like manner due to internal tensile stresses in the frictional surfaces, which stresses occur due to high thermal loading.

Excessive rises in the surface pressures in the radially inner contact regions then occur in the cold state.

Due to a thermally induced "breathing" of the wheel brake disk, i.e. a radial contraction and expansion at intervals, a "frictional sliding" occurs in the contact regions during every braking operation.

Due to the above-mentioned excessive rises in the surface pressures, especially at high braking powers, scoring occurs between the wheel brake disks and the wheel body in the region of the contact regions or local plastic deformation occurs in the wheel web, and this may lead in the long term to damage, such as the formation of cracks, in the wheel.

SUMMARY

The invention is based on the object of developing a rail wheel of the generic type in such a manner that an operationally induced overstressing is prevented with structurally very simple means and, as a result, the service life as a whole is increased.

This object is achieved by a rail wheel as claimed.

Scoring phenomena and, therefore, wheel damage are avoided by arranging a mechanically and thermally highly loadable intermediate layer at least in the respective contact region between the wheel brake disks and the wheel body.

The thermally induced radial deformations of the wheel brake disk, which are referred to as "breathing" in the prior art and occur during braking, are now ineffective, since the intermediate layer acts as it were as a sliding layer on which either the wheel brake disk correspondingly slides, when the intermediate layer is held on the wheel body in a radially secured manner, or the intermediate layer together with the connected wheel brake disk moves in a sliding manner thereon relative to the wheel body.

The planar dimension of the intermediate layer is expediently the same size or larger than the associated dimension of the contact region of the wheel brake disks, and therefore a low surface pressure is effective.

The above-mentioned scoring phenomena or plastic deformations in the wheel web are, therefore, prevented, and therefore the formation of cracks arising as a consequence thereof is also effectively avoided.

This, of course, results in a significant increase in the service life of the entire rail wheel and in a noticeable improvement in operational reliability.

For this purpose, it is also expedient to produce the intermediate layer from a metal sheet, the hardness of which is significantly greater than the hardness or strength of the wheel web.

A metal sheet made of stainless steel with polished surfaces, which is customarily present in the form of rolled stock, is ideally suited for this purpose, wherein the tensile strength of a metal sheet of this type should be >1000 N/mm$^2$ and the thickness approximately 1 mm. However, in principle, other metal sheet thicknesses are also usable.

According to at least one implementation, the intermediate layers each consist of circular ring portions which are lined up in a row next to one another in the circumferential direction.

In this case, circular ring portions of 30°, 60°, 120° or 180° are conceivable. In principle, of course, the intermediate layer may be designed as a single-part sheet metal ring. The circular ring portions are fastened in the radial direction in a form-fitting or frictionally engaged manner. The form-fitting connection can take place either at the wheel web or on the contact side of the wheel brake disk.

By contrast, a frictional connection is achieved by corresponding distortion by means of the bolted connection through which the wheel brake disks are fastened to the wheel web or to the wheel body.

Further implementation details of the invention are characterized in the dependent claims.

BRIEF DESCRIPTION OF THE FIGURES

Exemplary embodiments of the invention are described below with reference to the attached drawings, in which.

DETAILED DESCRIPTION

Figure 1:
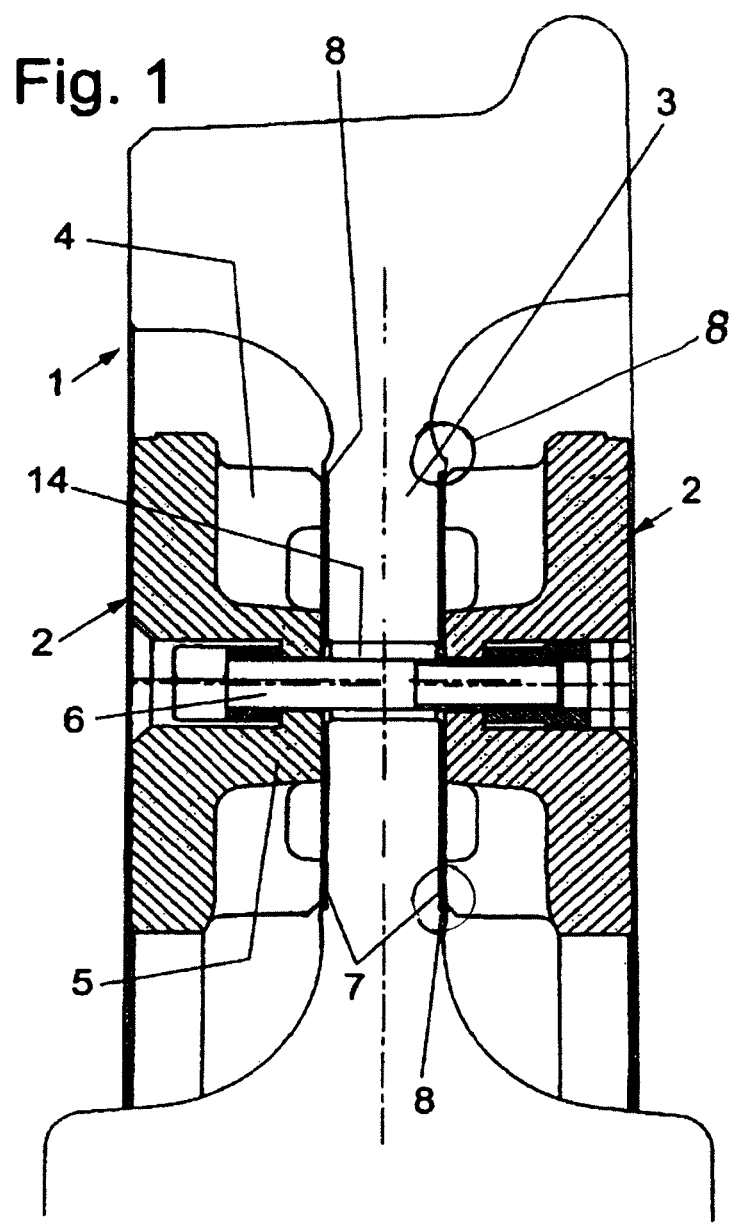
FIG. 1 shows a partial cutout of a rail wheel according to the invention in a sectioned side view, FIGS. 2 and 3 each show a further exemplary embodiment of the invention in an enlarged partial cutout corresponding to FIG. 1.

FIG. 1 illustrates a partial region of a rail wheel, specifically of one of the regions in which wheel brake disks 2 are connected on both sides to a wheel body 1.

In this case, a wheel web 3 of the wheel body 1, which wheel web forms two circumferential, radially extending contact surfaces, has a bore 14 through which a bolt 6 is guided, with which the wheel brake disks 2 are fixedly connected to the wheel body 1.

Each bolt 6, of which a plurality is furthermore distributed at an equal angular spacing on a circumferential circle, is guided through a fastening eye 5 in the respective wheel brake disk 2, the end side of said eye likewise forming a contact region in relation to the wheel web 3, such as cooling ribs 4 of the wheel brake disk.

An intermediate layer 7 assigned to each wheel brake disk 2 is arranged between the contact regions of the fastening eye 5 and the cooling ribs 4 and the wheel web 3, and therefore the wheel web 3 and the contact regions of the wheel brake disk 2 bear against said intermediate layer.

Said intermediate layers 7 are composed of a mechanically and thermally highly loadable material, e.g., of a hard-rolled metal sheet, the hardness or strength of which is greater than that of the wheel web 3.

Figure 4:
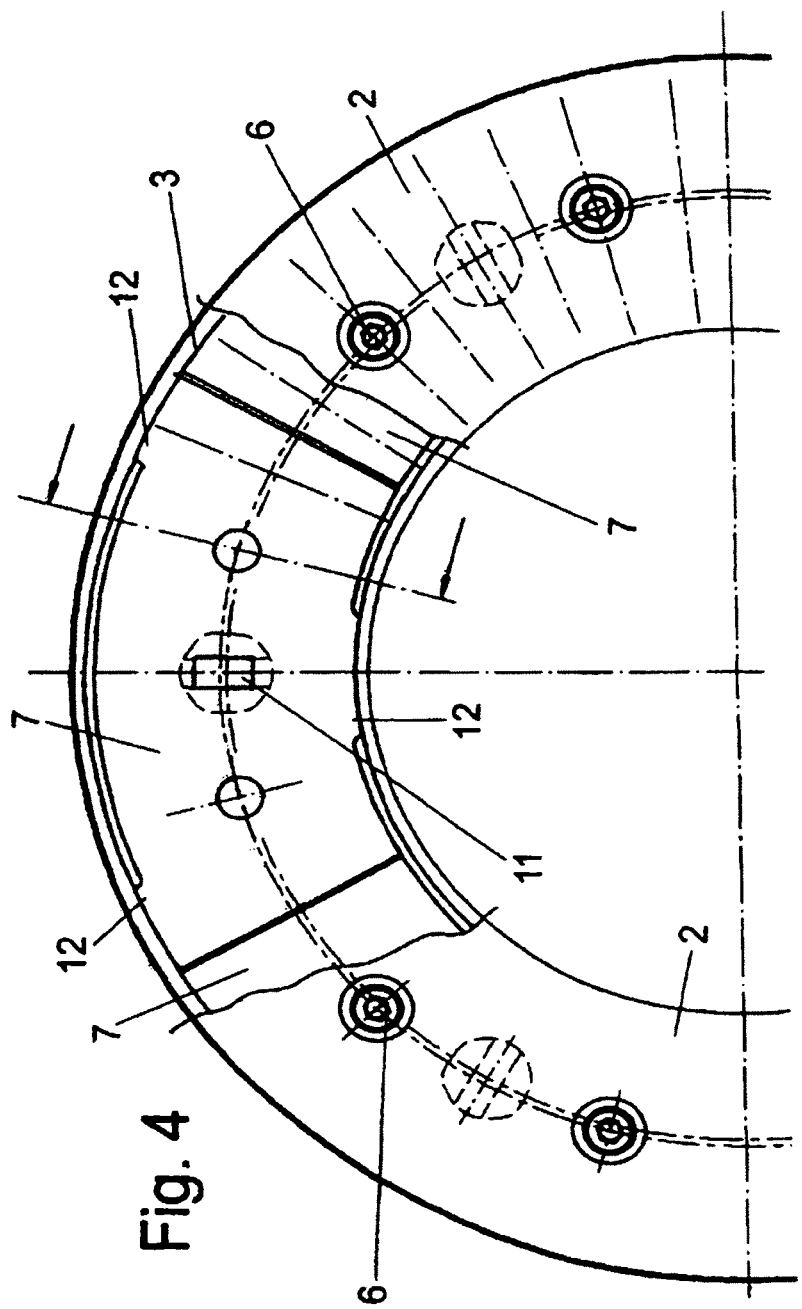
FIG. 4 shows part of the rail wheel in a top view.

As can be seen particularly clearly in FIG. 4, the intermediate layers 7 consist of circular ring portions which are distributed uniformly over the circumference, wherein the number of circular ring portions can vary. For example, for twelve bolts 6, the same number of circular ring portions is provided, said portions accordingly each enclosing an angle of 30°.

For radial securing purposes, the intermediate layers 7 may be held in a form-fitting manner, to which end, in the example shown in FIG. 1, the wheel web 3 has steps 8 in which the intermediate layers 7 are located in a manner substantially secured against displacement in the radial direction.

The intermediate layers 7 have corresponding openings for the passage of the bolts 6.

Figure 2:
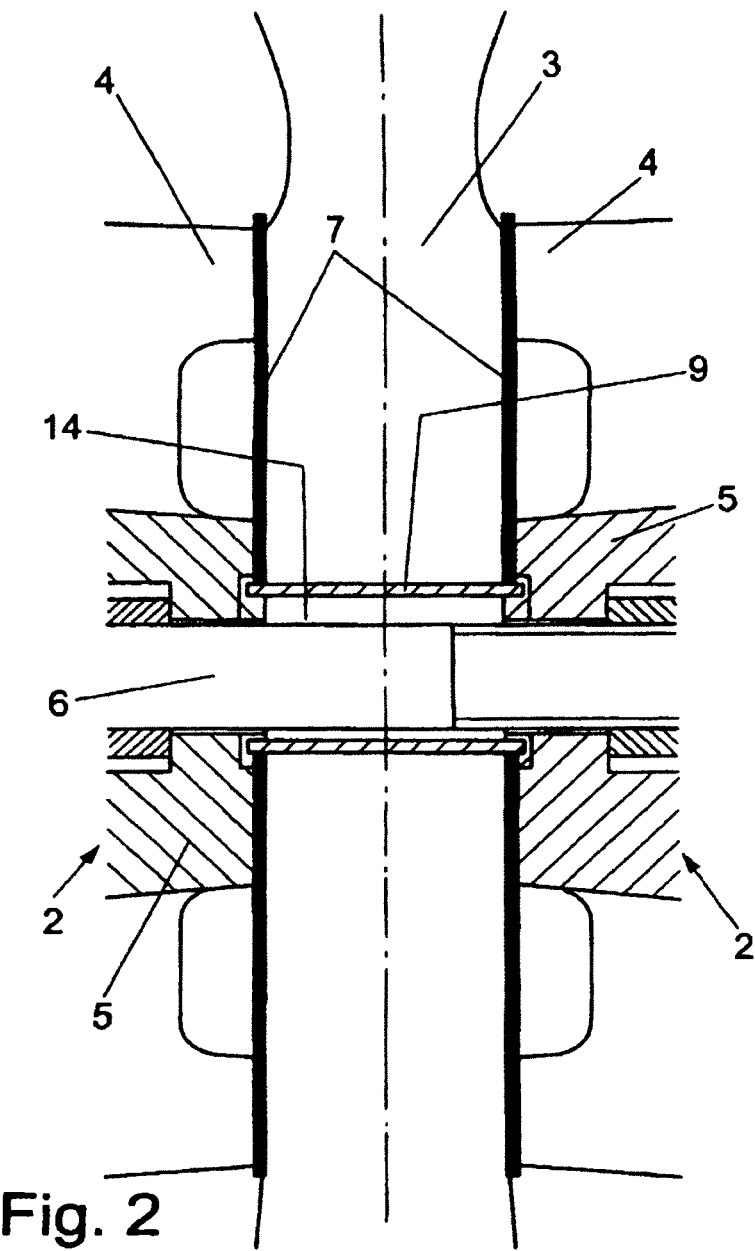
Figure 3:
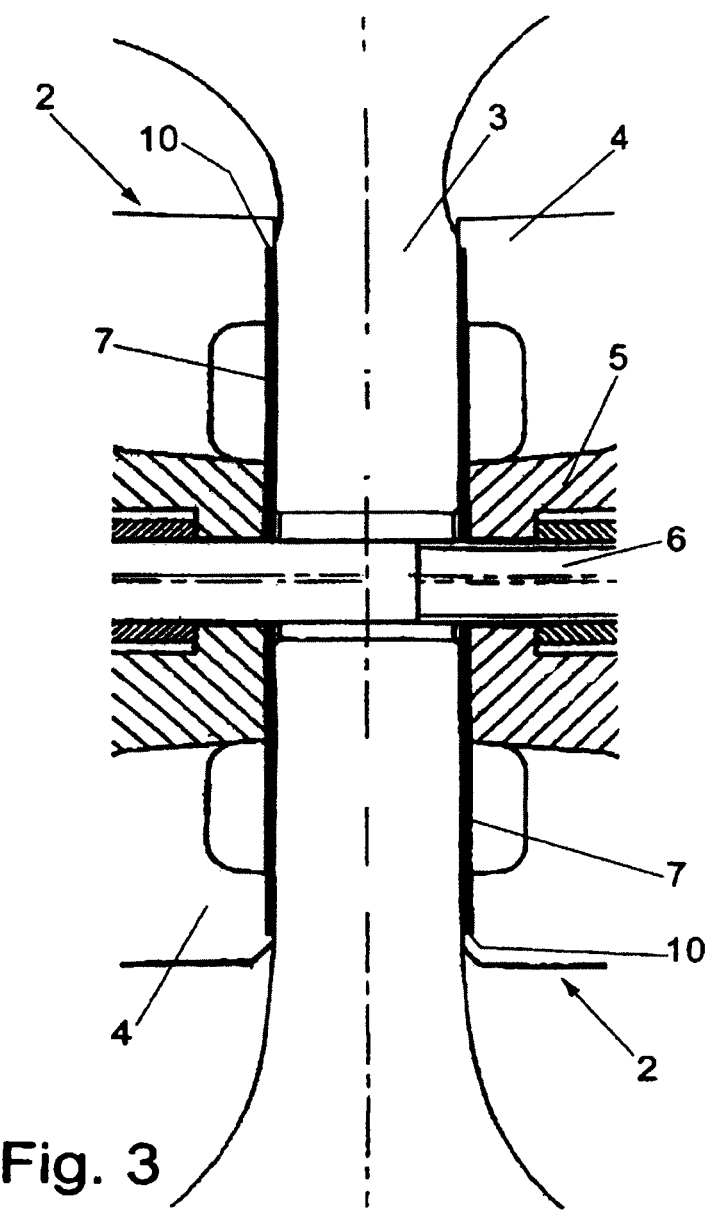
Figure 5:
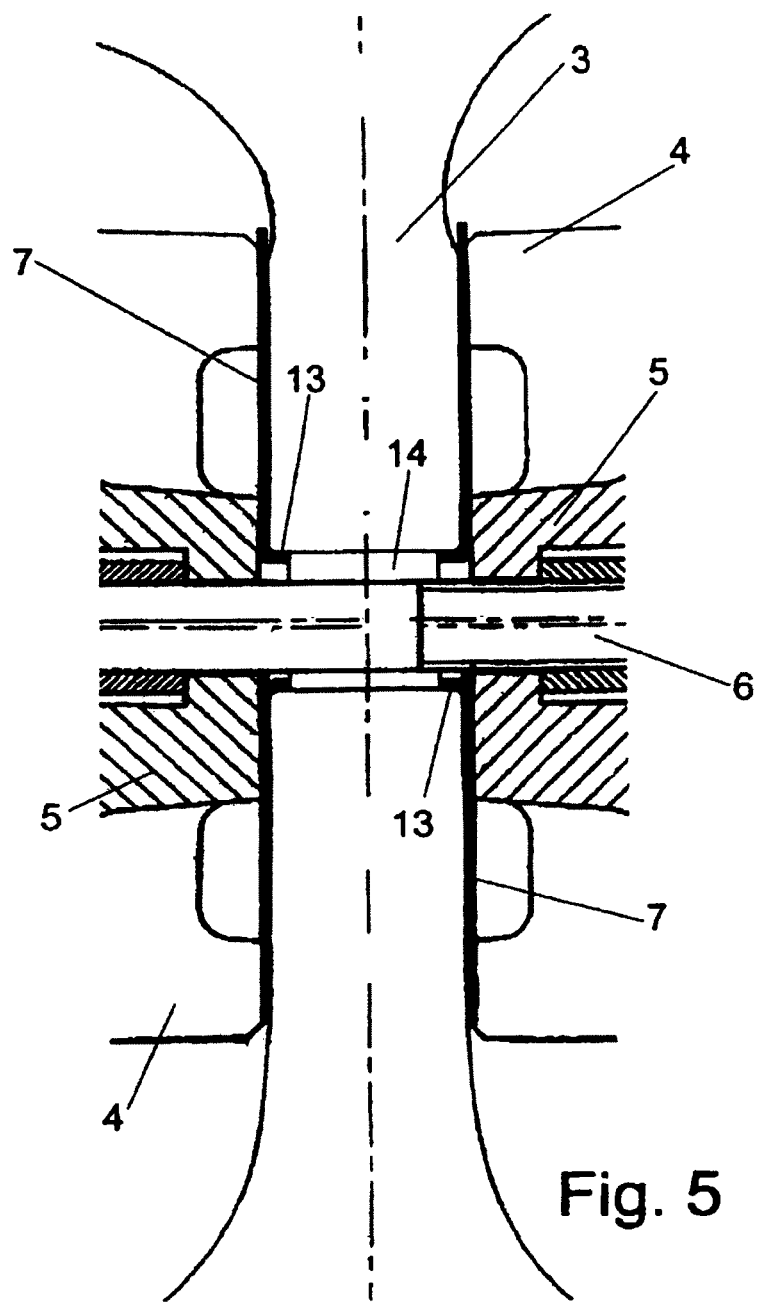
FIG. 5 shows a further exemplary embodiment of the invention in an enlarged partial cutout in a sectional side view.

In the example shown in FIG. 2 in which, as in FIGS. 3 and 5, an enlarged illustration in the contact region of the intermediate layers 7 is reproduced; the radial securing takes place in both directions, i.e., to the outside and to the inside, by means of a sleeve 9, which is inserted into the bore 14 and is held in an axially secured manner there. The sleeve 9 protrudes over the wheel web 3 on both sides at least by the thickness of the intermediate layers 7.

The outside diameter of the sleeve 9 approximately corresponds to the clear diameter of a central recess in the intermediate layer 7 such that the latter can easily be attached and is held in a manner secured against lateral displacement.

In the variant embodiments according to FIGS. 1 and 2, the intermediate layers 7 are, therefore, locked on the wheel web 3. By means of the visible extensive contact of the intermediate layers 7 with the wheel web 3, the outside radius of which is determined by the radial width of the cooling ribs 4 which virtually form outer contact regions, the production of significant temperature differences between the metal sheet and wheel web are avoided and therefore so too are thermally induced distortions of the intermediate metal sheets in relation to the wheel. The metal sheets do not slide on the wheel web.

By contrast, the wheel brake disk 2 which is supported on the respective intermediate layer slides in the radial direction on the intermediate layer 7 in the event of a thermally induced changing shape such that scoring or damage of the wheel web is prevented.

In the sense mentioned above, the intermediate layers 7 are also locked on the wheel web 3 in the example shown in FIG. 5.

For this purpose, the intermediate layers 7 have flanges 13 in the region of the bores 14 in the wheel web 3, the flanges being in the form of collars and projecting into the bore 14, and corresponding in the outside diameter thereof approximately to the clear diameter of the bore 14 such that radial securing in both directions is ensured.

FIG. 3 illustrates a further example of fixing the intermediate layers 7.

Here, the wheel brake disk 2, in the contact regions thereof which face the wheel web 3, has steps 10 in each of which one of the intermediate layers 7 is located and secured radially.

During a temperature-induced expansion and contraction of the wheel brake disks 2, in the radial direction, the respective intermediate layer 7 moves at the same time by the same amount such that the intermediate layers 7 virtually slide on the wheel web 3.

As can be seen in FIG. 4, there is a further type of radial fixing of the intermediate layers 7 in that punched-out portions are made in said intermediate layers in the region of overlap with sliding blocks 11, which are arranged between the wheel web 3 and the wheel brake disks 2, said punched-out portions corresponding in the basic contour dimensions thereof to the sliding blocks 11, wherein the sliding blocks 11 pass through the associated punched-out portions, thus resulting in form-fitting positional fixing on the wheel web 3.

Since temperature differences occur between the wheel brake disk 2 and the intermediate layer 7 during each braking operation, the intermediate layer 7 is designed in such a manner that differences in curvature do not result in any distortion.

The intermediate layer 7 is configured such that the intermediate layer 7 is provided on the outer and inner borders with contact portions 12 which bear against the associated edges of the steps 8, 10 (FIG. 4).

In principle, a single-part intermediate layer in the form of a ring is capable of functioning. However, due to the large diameter of the wheel brake disks 2 for rail wheels, it is substantially more cost effective to use circular ring portions, wherein the latter are punched or cut by laser beam or water jet.

In the example shown in FIG. 4, 60° circular ring portions are selected, and each intermediate layer 7 is provided on the outer border with two contact portions 12 and on the inner border with one contact portion 12 which is located in the center while the two outer contact portions are arranged, with respect to the length, in the outer border regions, thus resulting in three-point contact by means of which, as mentioned, distortion in the event of differences in curvature is prevented.

LIST OF REFERENCE NUMBERS

1 Wheel body
2 Wheel brake disk
3 Wheel web
4 Cooling rib
5 Fastening eye
6 Bolt
7 Intermediate layer
8 Step
9 Sleeve
10 Step
11 Sliding block
12 Contact portion
13 Flange
14 Bore

The invention claimed is:
1. A rail wheel comprising:
a wheel body; and
wheel brake disks connected to the wheel body on both sides with fastening elements,
wherein a mechanically and thermally highly loadable intermediate layer is provided between the wheel body and the wheel brake disks at at least respective contact regions of the wheel brake disks, wherein the intermediate layer is composed of a sheet of stainless steel having a polished surface and having a greater strength than the wheel body or a wheel web, and wherein the intermediate layer is held relative to the respective wheel brake disk in a radially secured manner, and wherein the intermediate layer acts as a sliding layer on which the combination of the intermediate layer and the connected wheel brake disk slides relative to the wheel body.

2. The rail wheel of claim 1, wherein the sheet has a tensile strength of ≥1000 N/mm².

3. The rail wheel of claim 1, wherein each intermediate layer is a circular ring.

4. The rail wheel of claim 1, wherein the intermediate layer is formed from circular ring portions.

5. The rail wheel of claim 4, wherein the circular ring portions are identical in size.

6. The rail wheel of claim 4, wherein the circular ring portions enclose identical angles.

7. The rail wheel of claim 4, wherein the circular ring portions each enclose an angle of 30°, 60°, 120° or 180°.

8. The rail wheel of claim 1, wherein a radial width of the intermediate layer corresponds to the maximum radial width of the contact regions of the wheel brake disks.

9. The rail wheel of claim 1, wherein the intermediate layer is located in steps of the wheel brake body.

10. The rail wheel of claim 1, wherein the intermediate layer is located for radial securing purposes in steps of the contact regions of the wheel brake disks.

* * * * *